No. 771,191. PATENTED SEPT. 27, 1904.
J. G. VENABLE, Sr.
BED BOTTOM.
APPLICATION FILED NOV. 30, 1903.
NO MODEL. 3 SHEETS—SHEET 3.
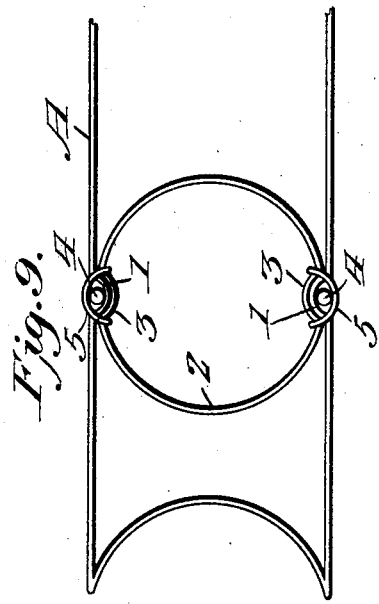
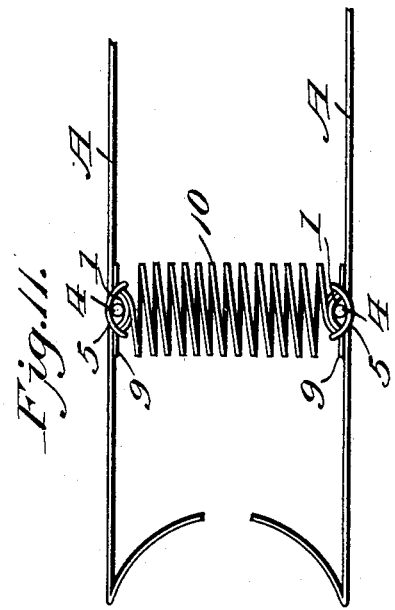
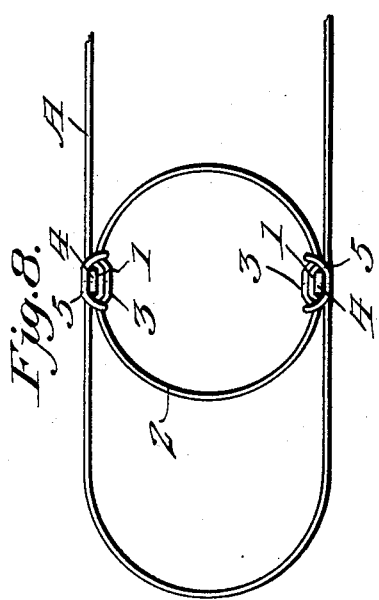
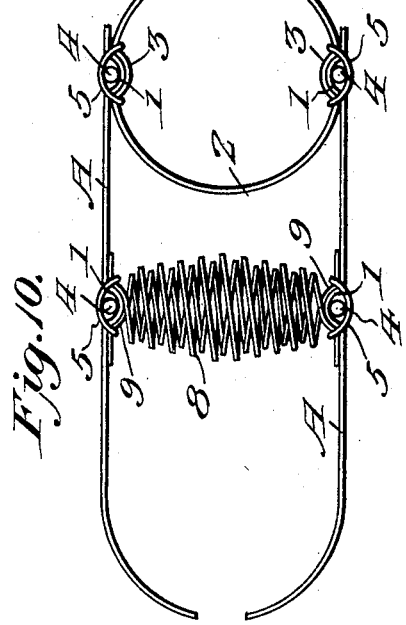
Witnesses
Edwin F. McKee
A. G. Heylmun
Inventor
Jos. G. Venable Sr.
By Victor J. Evans
Attorney No. 771,191.

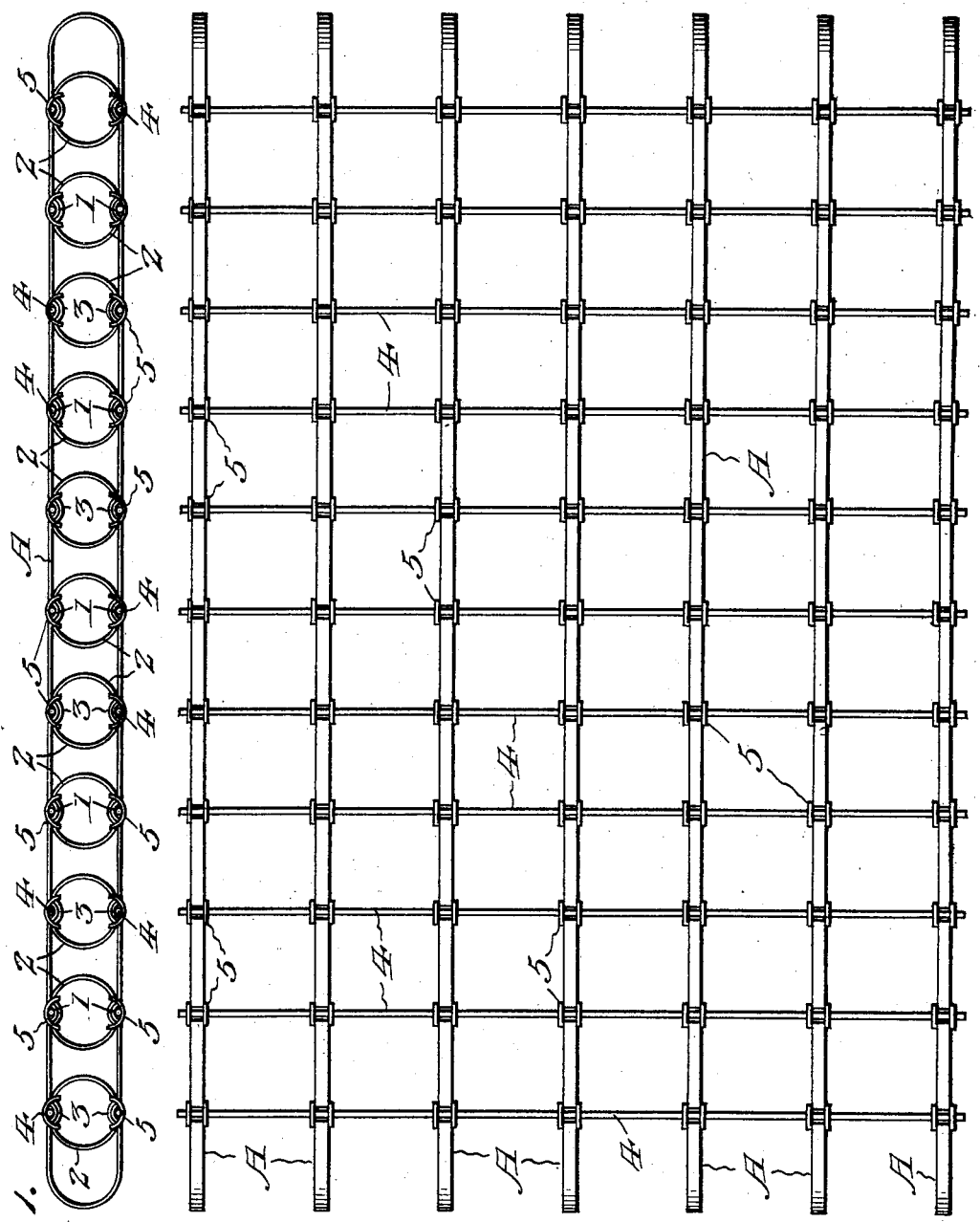

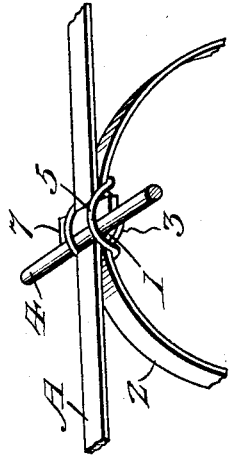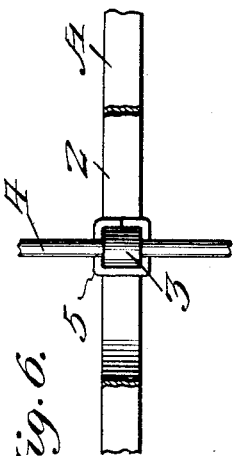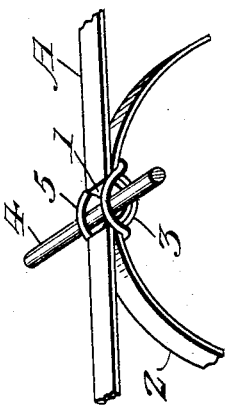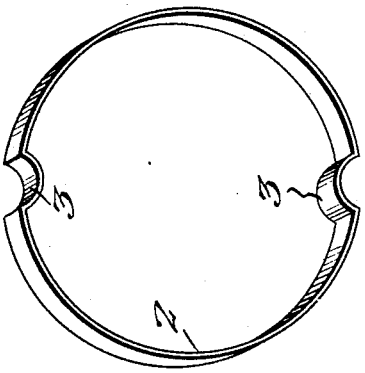

Patented September 27, 1904.

UNITED STATES PATENT OFFICE.

JOSEPH G. VENABLE, SR., OF PETERSBURG, INDIANA.

BED-BOTTOM.

SPECIFICATION forming part of Letters Patent No. 771,191, dated September 27, 1904.

Application filed November 30, 1903. Serial No. 183,263. (No model.)

*To all whom it may concern:*

Be it known that I, JOSEPH G. VENABLE, Sr., a citizen of the United States, residing at Petersburg, in the county of Pike and State of Indiana, have invented new and useful Improvements in Bed-Bottoms, of which the following is a specification.

My invention relates to improvements in bed-bottoms of that kind or class comprised of coacting springs and slats; and the object is to construct a bed-bottom the members of which are so aggrouped and secured together as to present a uniform resilient surface.

The invention embodies upper and lower longitudinal spring-slats, upper and lower transversely-disposed spring bars or slats connecting the longitudinal slats in relative position, and vertically-acting supporting-springs between the longitudinal and transverse slats, all as will be hereinafter fully specified and then the novelty of the invention particularly pointed out and distinctly claimed.

I have fully and clearly illustrated my improvements in the annexed drawings, to be taken as a part of this specification, and wherein like elements or parts appearing in different illustrations are designated by like notations.

Reference being had to the drawings, Figure 1 is a view in side elevation of my improved bed-bottom provided with the circular supporting-springs. Fig. 2 is a plan view of the bed-bottom, showing the relative arrangement of the members and the fastening means at their intersection and junction. Fig. 3 is a detail perspective view showing the means for clamping the parts together. Fig. 4 is a detail perspective view of one of the circular springs, showing the locking-seats therein. Fig. 5 is a detail perspective view of a portion of one of the longitudinal slats, showing the locking-seats therein. Fig. 6 is a plan view of the fastening, the upper portion of the circular spring being broken off to show the parts. Fig. 7 is a detail perspective view identical to Fig. 3, except that a wedge is shown as inserted to give additional security to the union of the parts. Fig. 8 is a side elevation of the longitudinal slats with outwardly-rounded or convex ends and one of the circular springs secured between the upper and lower lines of the slats. Fig. 9 is a view showing the longitudinal slats made with inwardly-curved or concaved ends and one of the circular springs positioned between the slats. Fig. 10 is a detail side elevation of a portion of one of the longitudinal slats, having a double-coil spiral spring arranged therein and also a circular spring and the ends of the slats separated and turned down. Fig. 11 is detail view of one of the longitudinal spring-slats having a single-coil spiral spring mounted therein and the inturned ends of the slats separated.

A designates endless wire spring-slats extended for such distance or length as the size of the bedstead may demand and formed at selected intervals with inwardly-directed locking-seats 1. These spring-slats are arranged in longitudinal position parallel with each other, as shown in Fig. 2 of the drawings. At the ends these springs may be rounded outward, as seen in Figs. 1, 2, 8, and 10, or they may be curved or concaved inward, as seen in Figs. 9 and 11, the purpose being to make the parallel bars or slats of the springs resiliently supported at the ends or turned out of the way. These springs may be made of selected spring-steel strands, which may consist of round wires or of flat bands of such gage as will suit them to the uses intended. At determined points in the upper and lower lines of these spring-slats are formed inwardly-directed locking-seats 1, as stated, to engage or seat in coincident depressions in the circular springs or in the loops of the spiral springs interposed between the upper and lower horizontal lines of the spring-slats. Between the lower and upper lines of the longitudinal springs are placed circular springs 2, formed with diametrically opposite inwardly-curved recesses 3, which fit over the locking-seats 1 in the lines of the longitudinally-disposed spring members, and thus hold the line-springs and the circular springs in proper relative position, substantially as seen in the drawings.

4 designates cross spring-rods which are laid across the lines of the spring-slats A in the curved depressions and when bound or clamped in position serve to maintain the spring-slats in proper relative position both vertically and longitudinally, substantially as shown in Fig. 1 of the drawings.

The longitudinal spring-slats, the cross wire spring bars or slats, and the springs are held clamped together at their union or points of intersection by bowed links 5, the side bars of which set over the spring cross bars or slats and the end bars of which set under the springs closely adjacent to the bases of the curved recesses 3, as shown in the drawings. These holding and clamping links may be made of a suitable rectangular frame made of wire and the side bars curved and fitting against and extending above each side of the curved seats in the respective springs, so that the cross bars or slats 4 may be run under the side pieces of the links and clamp all the pieces together. The links may also be made from a wire bent in the shape indicated and the ends brought together at the inner side of the springs and secured by a short twist. Should the cross-slats at any point of intersection with the other springs become loose or prove too loose at time of insertion to accomplish the required clamp, a small wedge 7 may be driven under the arch of the links at the side of the cross bar or slat; but generally the clamp is effected by the cross-slat itself.

The longitudinally-disposed springs may be made of endless wire, round or flat, shaped into oblong conformation, with convex and concave ends, as shown, or the upper and lower lines of the springs may be separated at the ends, as shown. The bed-bottom may consist of all circular springs arranged at determined distances apart and of such number as may be desired, or it may be made up of the circular springs and intermediate spiral springs, having their ends locked to the longitudinal spring-slats, as indicated in Figs. 10 and 11 of the drawings. The spiral springs may consist of double spirals, as 8, (see Fig. 10,) disposed in opposite directions and formed with links or loops 9 at their ends, which are curved to form seats to set on or against the locking-seats 1 in the lines of the longitudinal slats, or they may be single spirals, as 10, having their ends provided with locking-loops 9, same as in the use of the double spiral.

The parts are assembled in the following manner: The vertical springs are placed in position between the upper and lower lines of the longitudinally-disposed spring-slats with their inwardly-curved seats fitted to the inwardly-curved locking-seats in the longitudinally-disposed springs. The links are then placed so as to present their end bars under the springs and their bent or arched side bars projecting above the locking-seats in the longitudinal slats. The transverse rods or slats are then pushed or drawn through between the clamps and the locking-seats, and thus the union of the parts is complete. The assembling and securement of the parts when the vertically-disposed spiral springs are used is identical to that above stated. The curved loops at the ends of the springs are fitted to the locking-seats in the longitudinal slats, and then the clamping-links are applied, and the further disposition of the parts is identical to that stated.

It will be perceived that I provide a spring bed-bottom wherein all the members are resilient and which are so united at their unions and intersections as to coact in producing a strong construction resisting displacement in every direction, yet of such resiliency as to produce comfort and agreeable restfulness in a high degree. It will also be observed that the particular union of the parts is simple, easily accomplished, and of the requisite stability to promote durability.

The bed-bottom is reversible, either surface adapted to be used.

Having thus fully described my invention, what I claim as new is—

1. A bed-bottom, having upper and lower longitudinal parallel spring-slats formed with a plurality of inwardly-directed curved locking-seats, springs interposed between the longitudinal spring-slats and formed with inwardly-curved seats to receive the locking-seats in the spring-slats, cross-slats laid in the locking-seats of the longitudinal spring-slats, and clamping-links engaging the springs at opposite sides of the seat of the latter and projecting over the cross-slats adjacent to opposite edges of the upper and lower longitudinally-disposed spring-slats.

2. A bed-bottom having upper and lower longitudinal parallel spring-slats formed with a plurality of inwardly-directed curved locking-seats disposed in vertical alinement, springs interposed between the longitudinal spring-slats and formed with inwardly-curved seats to loosely receive the locking-seats of the spring-slats, cross-slats laid in the locking-seats of the longitudinal spring-slats, and clamping-links engaging the springs and projecting over the cross-slats, said links forming the sole means of securing the springs, longitudinal spring-slats and cross-slats.

3. A bed-bottom, having upper and lower longitudinal parallel spring-slats integrally and resiliently connected at their ends by curved bows and formed with a plurality of inwardly-directed curved locking-seats, circular springs interposed between the spring-slats and formed with diametrically-opposed inwardly-curved seats to loosely receive the similar seats of the longitudinal spring-slats, cross-slats arranged in the locking-seats of the longitudinal spring-slats, and clamping-links engaging the springs and extending over the cross-slats.

4. A bed-bottom, having upper and lower longitudinal parallel spring-slats integrally and resiliently connected at their ends by curved bows and formed with inwardly-curved locking-seats at regular intervals, circular band-springs interposed between the said spring-slats and formed with diametrically-opposed inwardly-directed curved seats to receive the seats of the said spring-slats, vertically-positioned spiral springs intermediate the circular springs and formed with curved loops at their ends to receive a portion of the seats of the said longitudinal spring-slats, spring cross bars or slats disposed in the locking-seats of the longitudinal slats, and links embracing portions of the springs and extending upwardly over the cross bars or slats.

In testimony whereof I affix my signature in presence of two witnesses.

JOSEPH G. VENABLE, Sr.

Witnesses:
 FRANK ELY,
 THOMAS H. DILLON.